May 26, 1970  K. EVANS  3,513,716
GEAR SHIFTER MECHANISMS
Filed Dec. 23, 1968
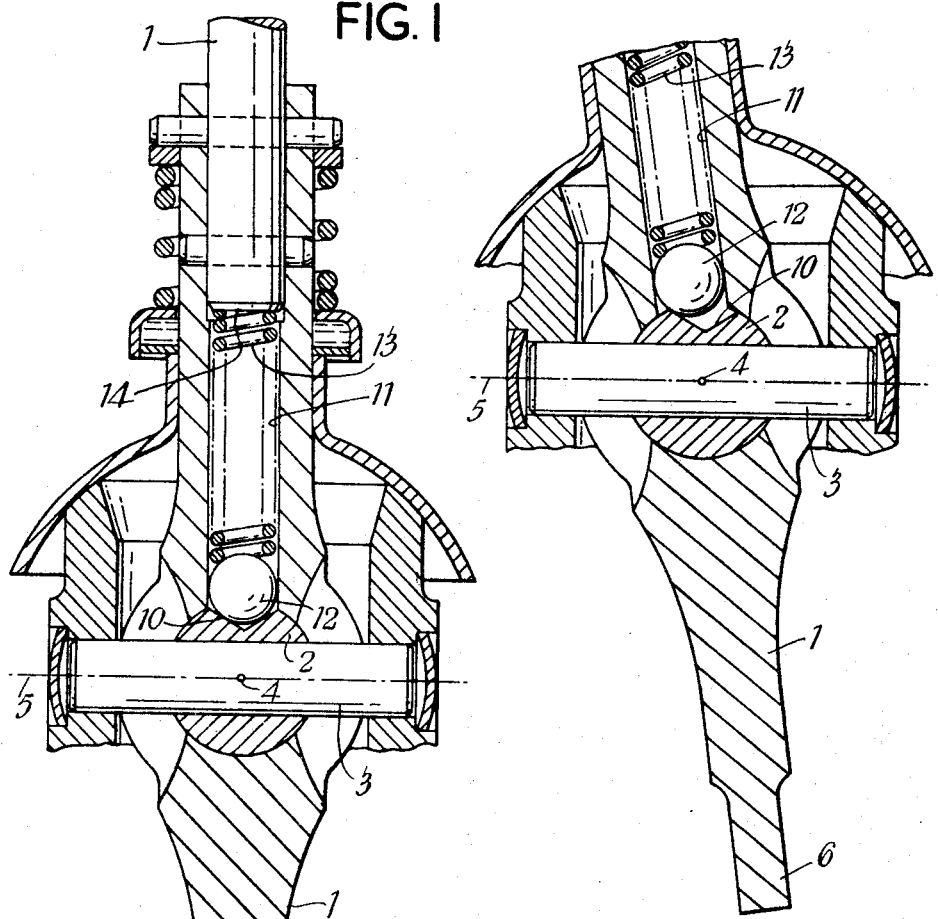
INVENTOR
KENNETH EVANS
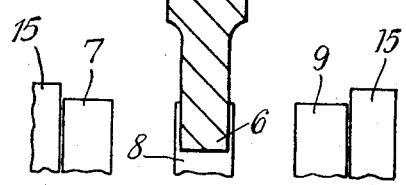
ATT'Y

United States Patent Office 3,513,716
Patented May 26, 1970

---

3,513,716
GEAR SHIFTER MECHANISMS
Kenneth Evans, Doncaster, England, assignor to International Harvester Company, Chicago, Ill., a corporation of Delaware
Filed Dec. 23, 1968, Ser. No. 786,288
Claims priority, application Great Britain, Mar. 1, 1968, 10,030/68
Int. Cl. G05g 9/12
U.S. Cl. 74—473    5 Claims

ABSTRACT OF THE DISCLOSURE

A gear shifter lever carried on two pivots of which the axes intersect at right angles is biased towards its neutral position by means of a detent, preferably a ball, which is spring-urged between the gear shifter lever and an indentation in one pivot, the indentation having sides angled with respect to the gear shifter lever.

SUMMARY OF THE INVENTION

This invention relates to gear shifter mechanisms and more particularly, but not exclusively, to such mechanisms for use on tractors for agricultural purposes.

It is common practice on vehicles to provide a gear shifter mechanism having three parallel lines of movement of the gear shifter lever, and such a gear shifter mechanism is in use on both cars and tractors. So far as tractors are concerned it is not as usual to require the facility for changing gear while the vehicle is on the move as with a car, and it is consequently common with tractors to have to stop the tractor before changing gear. It is a main object of the present invention to provide a gear shifter mechanism which is a modified version of the gear shifter mechanisms previously used on tractors and which does provide the facility that the gear may be changed smoothly and quickly to a new gear position thus enabling gear change on the move to be more conveniently effected. It will be appreciated that a gear shifter mechanism designed in accordance with the present invention to meet this objective will have an application on cars as well as on tractors, although it has in the first instance been devised to meet the problem existing in tractors.

According to the present invention there is provided a gear shifter mechanism including a gear shifter lever carried on two pivots of which the axes intersect at right angles, the lever being pivotable on a first pivot to a selectable position in which one end of the lever engages with one of a plurality of shifter rails located in a direction parallel to the axis of the first pivot and being pivotable on a second pivot to move the engaged shifter rail longitudinally to move a gear wheel along a shaft, characterised by the provision of resilient biasing means acting between the shifter lever and the first pivot whereby the shifter lever is biased to return to a particular position on the said first pivot and the end of the shifter lever is consequently engaged with a particular shifter rail.

In the specific embodiment in accordance with the present invention there are three shifter rails located in a direction parallel to the axis of the first pivot, and the resilient biasing means is effective to return the shifter lever to a central position in which the end of the shifter lever is engaged with the middle one of the three shifter rails.

The first pivot preferably has a circumferential surface in which there is an indentation having sides angled with respect to the shifter lever, and the resilient biasing means advantageously comprises a detent mounted for movement in a bore within the shifter lever, and a spring urging the detent into engagement with the indentation.

Conveniently the detent is a ball which is spring-urged within the shifter lever, but a plunger may be substituted for the ball.

The invention will be more clearly understood from the following detailed description of a preferred embodiment thereof, which is made, by way of example, with reference to the accompanying drawings, in which:

FIG. 1 is a sectional view of a gear shifter lever incorporating the present invention, FIG. 2 is a fragmentary view of part of the gear shifter lever of FIG. 1 when the lever has been displaced from its central position.

Referring to the drawings there is shown a gear shifter lever 1 which is carried by two pivots 2 and 3. The first pivot 2 is a shaft which is supported by the second pivot 3 which is a shaft of smaller external diameter, and the axis 4 of the first pivot 2 (which is perpendicular to the plane of the sectional view which is FIG. 1) is at right angles to the axis 5 of the second pivot 3.

The lower end 6 of the gear shifter lever 1 is engageable in a central slot in any one of three gear shifter rails 7, 8 and 9, and the gear shifter lever 1 is shown in FIG. 1 with the end 6 engaged in the middle one 8 of the three shifter rails.

Cut out of the external cylindrical surface of the first pivot 2 is an indentation or slot 10, the sides of which are angled with respect to the length of the gear shifter lever 1 so that the indentation or slot 10 is symmetrical with respect to the second pivot 3. Located within a bore 11 within the gear shifter lever 1 is a ball 12 which is continuously urged downwardly by a spring 13, the opposite end of which is seated on a solid member 14 at the end of the bore 11.

In the position shown in FIG. 1 the ball 12 is spring-urged into the full depth of the indentation or slot 10, with the result that the gear shifter lever 1 is maintained in the upright position illustrated in which its lower end 6 is engaged in the middle shifter rail 8.

For selection of a gear engaged by longitudinal movement of either of the gear shifter rails 7 or 9, the operator moves the upper end (not shown) of the gear shifter lever 1 to either the left or the right so that the gear shifter lever 1 pivots about the first pivot 2 and the lower end 6 of the gear shifter lever 1 is moved into the slot of either of the gear shifter rails 7 or 9. The existence of stops 15 prevents the gear shifter lever 1 being moved too far to the left or right and renders engagement of either of the gear shifter rails 7 or 9 simple. The gear shifter lever 1 is then moved either forwardly or backwardly so that the lever 1 pivots about the second pivot 3 to effect engagement of the gear or gears controlled by the shifter rail 7 or 9.

During the movement of the gear shifter lever 1 about the first pivot 2 the ball 12 is caused to ride up one side of the indentation 10, as illustrated in the fragmentary view which is FIG. 2, for engagement of the end 6 of the gear shifter lever 1 with the gear shifter rail 9. So long as a forward or backward movement has been made about the second pivot 3 in addition to the pivoting about the first pivot 2 the gear shifter lever 1 will be retained in engagement with the gear shifter rail 9, and the ball 12 urged by the spring 13 will have no effective action. However, when the gear shifter lever 1 is in a position in which there is no pivoting about the second pivot 3 and is not held to either the left or right by the operator, the action of the spring-urged ball 12 on the side of the indentation or slot 10 will cause the gear shifter lever 1 to be pivoted about the pivot 2 to its central position illustrated in FIG. 1, in which the ball 12 is at the root of the identation or slot 10 and is unable to move further.

In this central position, as already described, the gear shifter lever 1 is in engagement with the middle gear shifter rail 8, so that selection of this middle shifter rail is made automatically and quickly by the spring-urged ball 12 which comprises a resilient means biasing the gear shifter lever 1 to this central position.

The gear shifter mechanism in accordance with the present invention effctively eliminates searching for any of the positions of engagement of the gear shifter rails 7, 8 and 9. Consequently the gear shifter mechanism enables the gears to be changed readily when the vehicle incorporating the gear shifter mechanism is moving.

I claim:

1. A gear shifter mechanism including a gear shifter lever carried on two pivots of which the axes intersect at right angles, the lever being pivotable on a first pivot to a selectable position in which one end of the lever engages with one of a plurality of shifter rails located in a direction parallel to the axis of the first pivot and being pivotable on a second pivot to move the engaged shifter rail longitudinally to move a gear wheel along a shaft, characterised by the provision of resilient biasing means acting between the shifter lever and the first pivot whereby the shifter lever is biased to return to a particular position on the said first pivot and the end of the shifter lever is consequently engaged with a particular shifter rail.

2. A gear shifter mechanism according to claim 1, wherein the first pivot has a circumferential surface in which three is an identation having sides angled with respect to the shifter lever, and wherein the resilient biasing means comprises a detent mounted for movement in a bore within the shifter lever and a spring urging the detent into engagement with the indentation.

3. A gear shifter mechanism according to claim 1, wherein there are three shifter rails located in a direction parallel to the axis of the first pivot and wherein the resilient biasing means is effective to return the shifter lever to a central position in which the end of the shifter lever is engaged with the middle one of the three shifter rails.

4. A gear shifter mechanism according to claim 3, wherein the first pivot has a circumferential surface in which there is an indentation having sides angled with respect to the shifter lever, and wherein the resilient biasing means comprises a detent mounted for movement in a bore within the shifter lever and a spring urging the detent into engagement with the indentation.

5. A gear shifter mechanism according to claim 4, wherein the detent is a ball.

References Cited

UNITED STATES PATENTS

| | | | |
|---|---|---|---|
| 2,174,504 | 9/1939 | Cole | 74—473 |
| 3,350,957 | 11/1967 | Morse | 74—473 |
| 3,382,733 | 5/1968 | Miller et al. | 74—543 |

MILTON KAUFMAN, Primary Examiner

U.S. Cl. X.R.

74—543